(12) United States Patent
Schug et al.

(10) Patent No.: US 7,521,647 B2
(45) Date of Patent: Apr. 21, 2009

(54) JOINING DEVICE

(75) Inventors: Alexander Schug, Staufenberg (DE); Hans-Gerhard Kortmann, Vechelde (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/333,812

(22) Filed: Jan. 17, 2006

(65) Prior Publication Data

US 2006/0186092 A1 Aug. 24, 2006

Related U.S. Application Data

(63) Continuation of application No. PCT/EP2004/007472, filed on Jul. 8, 2004.

(30) Foreign Application Priority Data

Jul. 17, 2003 (DE) ................. 103 33 415

(51) Int. Cl.
*B23K 9/20* (2006.01)
(52) U.S. Cl. ........................... 219/98
(58) Field of Classification Search ........... 219/98, 219/99
See application file for complete search history.

(56) References Cited

U.S. PATENT DOCUMENTS

| | | | |
|---|---|---|---|
| 4,267,425 A | 5/1981 | Kondo |
| 4,441,007 A | 4/1984 | Jordan |
| 4,567,344 A | 1/1986 | Michalski, Jr. |
| 4,942,283 A | 7/1990 | Mergell |
| 5,171,959 A | 12/1992 | Schmitt et al. |
| 5,252,802 A | 10/1993 | Raycher |
| 5,317,123 A | 5/1994 | Ito |
| 5,321,226 A | 6/1994 | Raycher |
| 5,389,761 A | 2/1995 | Kresse, Jr. |
| 5,925,268 A | 7/1999 | Britnell |
| 5,961,858 A | 10/1999 | Britnell |
| 5,977,506 A | 11/1999 | von Daniken |
| 6,011,234 A | 1/2000 | Kirchner et al. |
| 6,452,131 B2 | 9/2002 | Britnell |
| 6,660,958 B2 | 12/2003 | Kurz et al. |

(Continued)

FOREIGN PATENT DOCUMENTS

DE 35 42 069 6/1986

(Continued)

OTHER PUBLICATIONS

"Stud Welding Logic. A New TUCKER Technology!"—Emhart Tucker brochure, 6 pages (published before Feb. 2002).

*Primary Examiner*—Kevin P Kerns
(74) *Attorney, Agent, or Firm*—Harness, Dickey & Pierce, P.L.C.

(57) ABSTRACT

A joining device for joining two parts by welding has a joining head including a lift device for linear transport of a joining unit along a lift axis relative to the joining head. The joining device executes a joining operation by transporting the joining unit out of a lift position towards a base position. The joining unit includes a boom extending outside of the joining head, at a free end of which the joining operation takes place offset and parallel to the lift axis. The joining unit is oriented relative to the joining head such that the joining unit runs out relative to the joining head in the lift position.

18 Claims, 4 Drawing Sheets

U.S. PATENT DOCUMENTS

| | | | |
|---|---|---|---|
| 7,060,930 B2 * | 6/2006 | Schmitt et al. | 219/98 |
| 7,291,802 B2 * | 11/2007 | Muller et al. | 219/99 |
| 2003/0141346 A1 | 7/2003 | Madsak et al. | |
| 2004/0025331 A1 | 2/2004 | Schmitt et al. | |
| 2004/0037634 A1 | 2/2004 | Muller et al. | |
| 2004/0056005 A1 | 3/2004 | Willershausen | |
| 2004/0200808 A1 | 10/2004 | Schmitt | |
| 2004/0245221 A1 | 12/2004 | Schmitt et al. | |
| 2005/0072765 A1 | 4/2005 | Schmitt et al. | |

FOREIGN PATENT DOCUMENTS

| | | | |
|---|---|---|---|
| DE | 94 17 371.0 | 2/1995 | |
| DE | 44 00 350 | 7/1995 | |
| DE | 101 38 947 | 2/2003 | |
| EP | 1 123 769 | 8/2001 | |
| GB | 2 092 044 | 8/1982 | |
| GB | 2 285 405 | 7/1995 | |
| GB | 2 285 405 A * | 7/1995 | |
| WO | WO 96/05015 | 2/1996 | |
| WO | WO 96/11767 | 4/1996 | |
| WO | WO 01/62425 | 8/2001 | |
| WO | WO 01/62426 | 8/2001 | |

\* cited by examiner

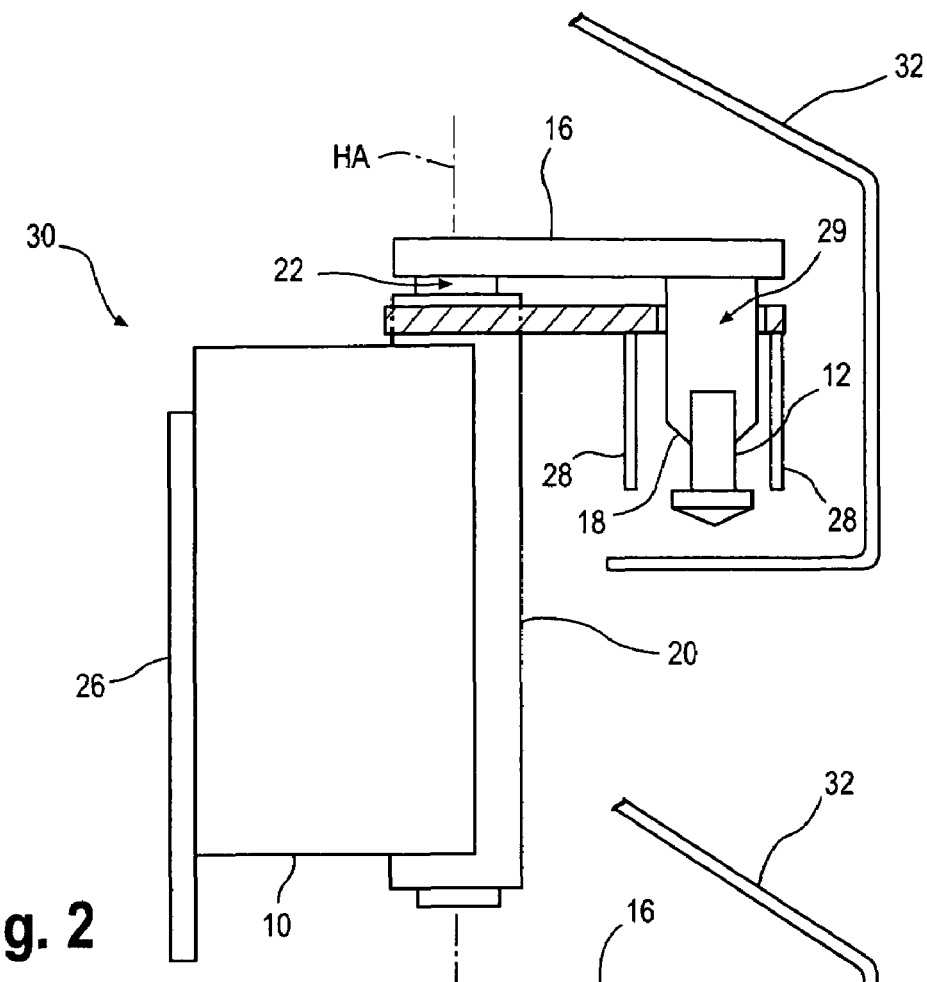
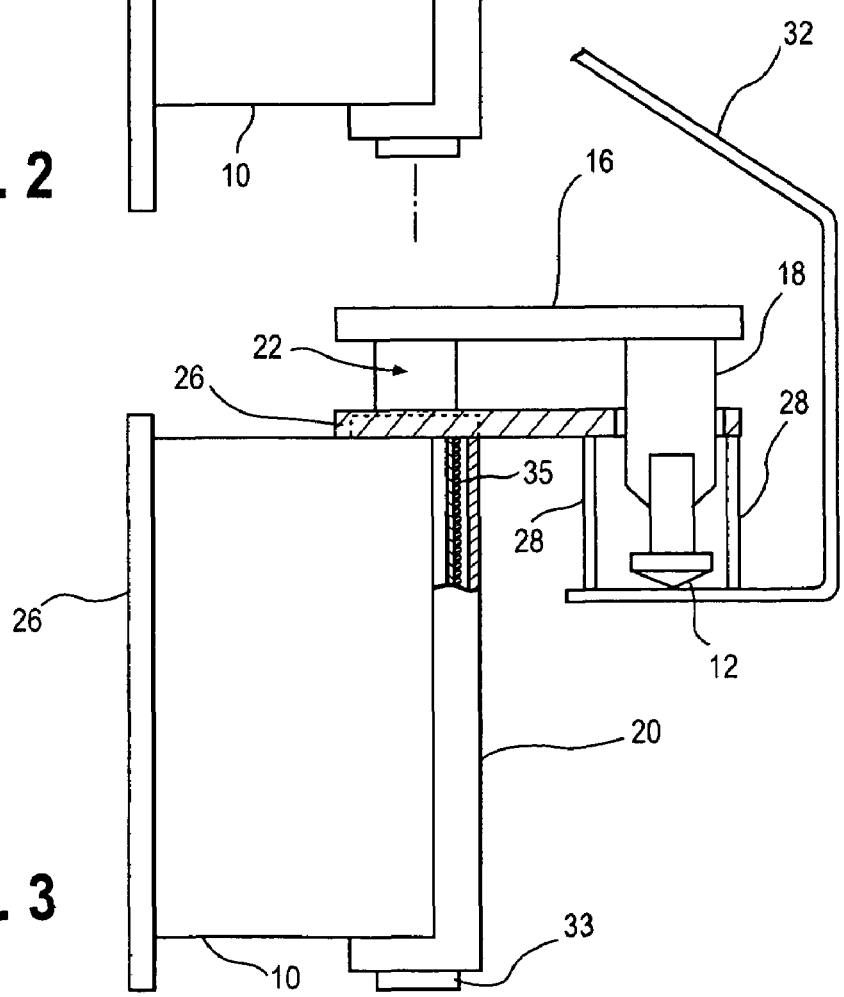
Fig. 2
Fig. 3

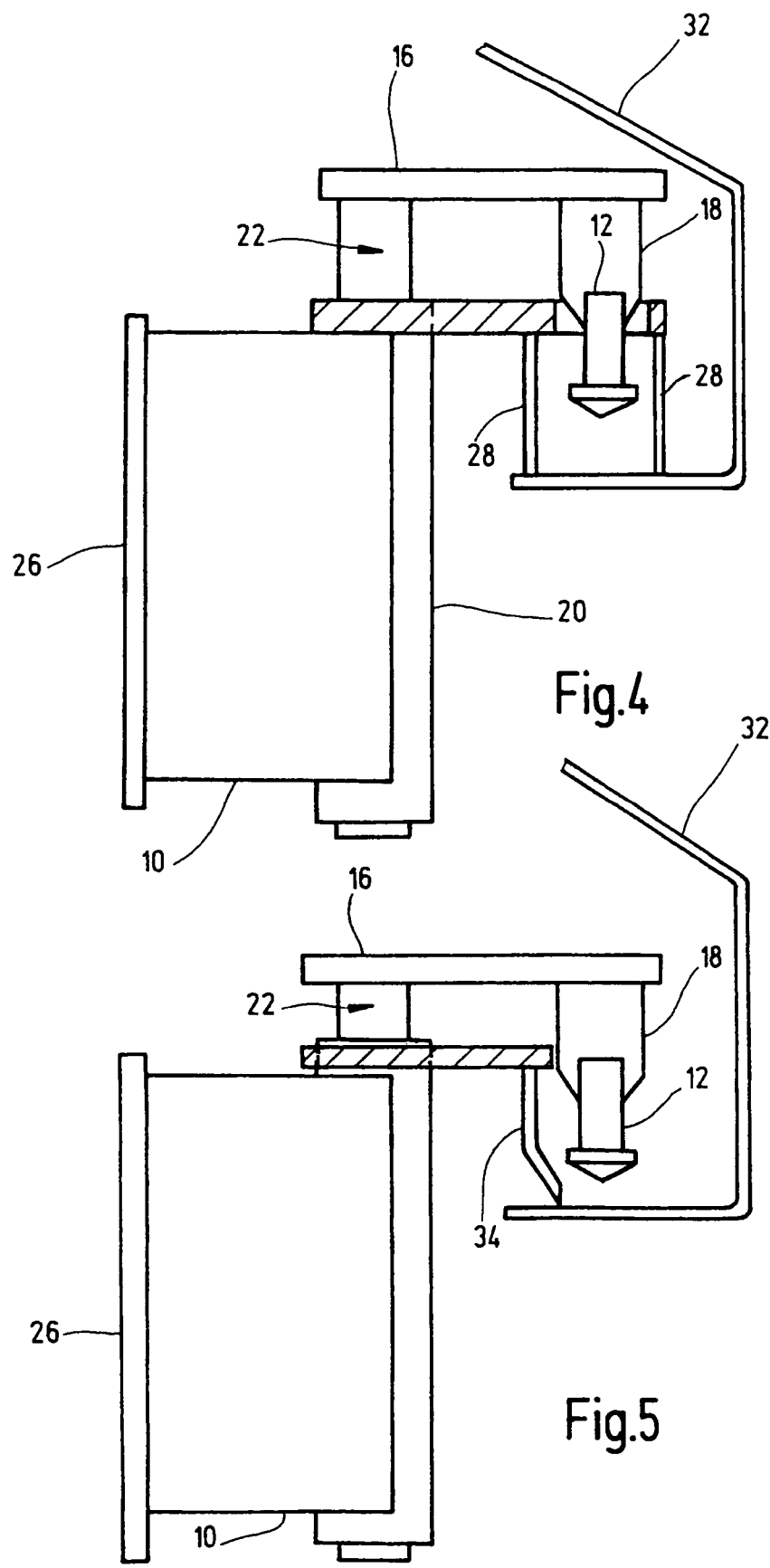

JOINING DEVICE

CROSS-REFERENCE TO RELATED APPLICATIONS

This application is a continuation of International Application Serial No. PCT/EP2004/007472, filed on Jul. 8, 2004, which claims priority to German Application Serial No. DE 10333415.7, filed on Jul. 17, 2003, both of which are incorporated by reference herein.

BACKGROUND AND SUMMARY

The present invention relates to a joining device for the joining, in particular the welding, of two parts one to the other, having a joining head comprising a lifting device for linear transport of a joining unit along a lift axis relative to the joining head, said joining device performing a joining operation by transporting the joining unit out of a lift position towards a base position, and the joining unit comprising a boom extending outside of the joining head, at the free end of which the joining operation takes place offset parallel to the lift axis. The invention relates further to a process for the joining, in particular the welding, of two parts one to the other, comprising the following steps: transport of a joining unit relative to a joining head into a lift position by means of a lifting device in order to join the parts one to the other towards a base position of the joining unit, and transport of the joining unit into the base position.

Such a joining device and such a joining process are disclosed in EP 0,367,414 B1. By joining, in the production engineering sense, is meant a process of positive geometrical, dynamic or material connection of two or more parts, or of parts to an amorphous material, by juxtaposition (e.g. insertion, encasement), pressing on or into (e.g. screwing, wedging, shrinking), material connection (e.g. welding, soldering, bonding), molding (e.g. fusing, casting), transforming (e.g. rolling) or filling (e.g. impregnating an electrical winding).

In short-time electric arc welding, an element is welded onto a part. Thus, an electric arc is set up between the element and the part, incipiently fusing the frontal surfaces. Then the element and the part are moved towards each other so that the melts mingle. The arc is short-circuited and the whole melt solidifies. It is possible to draw the electric arc (lift ignition). Here, the element is first placed on the part (base position). Then a pilot current is switched on, and the element is lifted relative to the part up to a desired level (lift position), thus drawing an arc. Only then, the welding current is switched on and the element is replaced on the part, whereupon the melts mingle. Then the welding current is switched off, so that the entire melt solidifies.

To obtain uniformly good welding results, it is important, among other things, to find the relative position between element and part, in particular to lift the element to the correct level before the welding current is switched on. For this purpose, as a rule each welding operation is preceded by a measurement of the relative position, particularly in the form of a zero position determination. This is especially important in the case of robot-based systems. True, present-day robots are generally able to position with comparative precision. High precision, however, especially owing to the large masses in motion, is not available with very high dynamics. Ordinarily, the robots have a scope of motion in three coordinates. In the simplest case, a robot is an automatically driven linear guide (carriage) on which a welding head is mounted. As a rule, such a carriage is attached to the arm of a multi-axial (bent arm) robot.

In the automotive industry, bolt welding systems are employed. There they serve primarily to weld elements such as threaded or unthreaded bolts, eyes, nuts, etc. onto the body sheet-metal. These elements then serve as holding anchors for attachment, for example, of interior trim, cable trees or the like. In the automotive industry, speed of production is an essential consideration. Within a few minutes, hundreds of elements are to be welded on in various positions automatically by means of robots. The robots must consequently move with high dynamics.

Thus, it is known that a welding head base bearing a carriage may be attached to the arm of a robot. The carriage is high-dynamically movable, commonly by means of a pneumatic or hydraulic system. On the carriage, the welding head proper is mounted, in turn possessing a lifting device to move the element with high precision. To determine the relative position between the element and the part, it is known that a so-called support foot may be attached to the welding head (for example, "Neue TUCKER-Technologie. Bolzenschweissen mit System," Emhart Tucker, September 1999).

The spatial size of a welding head, however, represents a natural spatial barrier within which bolt welding with welding heads is possible. So that bolts can be welded in locations of difficult access as well, there are welding heads known in the prior art that are connected to a welding gun by way of an extension cable. Such a welding head is disclosed in DE G 94 17 371. The welding head of DE G 94 17 371 is much smaller than the welding gun connected to it. This welding head is suitable for applications where not much room is available. A disadvantage of this type of bolt welding is that the welding device must be operated by hand. Both the welding gun and also the welding head connected by way of an extension must be positioned and actuated manually by a worker. This is time-consuming. It is also reflected in high production costs, operating labor being costly as a rule.

Hence, one object of the invention is to create a joining device and a process whereby automated joining can be accomplished even in positions difficult of access. This object is accomplished by a joining device of the kind initially mentioned, wherein the joining unit is so oriented relative to the joining head that the joining unit is extended in the lift position. Further, the object is accomplished by a process for joining of the kind initially mentioned, wherein the joining unit is extended into the lift position relative to the joining head.

In this way, it is brought about that even positions of difficult access can be reached automatically with a joining head for purposes of joining. The invention makes it possible, by contrast with the prior art, to join 'rearward.' The 'rearward' orientation will be explained in the following. Besides, time and expense can be saved. The device and the process according to the present invention open up a multitude of applications in which but little space is available for joining.

It is preferred as well for the joining unit to be so oriented relative to the joining head that the joining device is run into the base position. According to a preferred embodiment, the joining head comprises a holding device for holding one of the parts. Further, it is preferred for a held part to be a bolt and the holding device a bolt holder. Also, it is advantageous if the joining head is a welding head. Through these measures, it is possible to utilize the joining device as an arc welding device, capable in particular of welding bolts to a part.

According to another preferred embodiment, the joining head comprises a support foot. An additionally provided support foot facilitates the positioning of the joining head relative to the part to which the other part is attached. Further, it is preferred for the joining head to be attached to a carriage.

Thus, it is possible rapidly to transport the joining head, and with it the joining unit, into the base position.

According to another embodiment, the joining device further comprises a part feed, in particular an element feed. This likewise will enhance the speed of an operating cycle, since parts can be supplied automatically rather than manually. It has also proved advantageous for the lifting device to comprise a compression spring, to be wound by means of a linear motor. Moreover, the linear motor is extended in the lift position. Through these measures, it is possible to weld 'rearward.' It will be understood that the features aforementioned and those yet to be illustrated below may be employed not only in the particular combination specified but also in other combinations, or alone, without departing from the scope of the present invention.

BRIEF DESCRIPTION OF THE DRAWINGS

Embodiments of the invention are represented by way of example in the drawings and will be illustrated in more detail in the description to follow. In the drawings:

FIGS. 2 to 5 show schematic views of a joining operation using a joining device according to the present invention.

DETAILED DESCRIPTION

Figure 1:
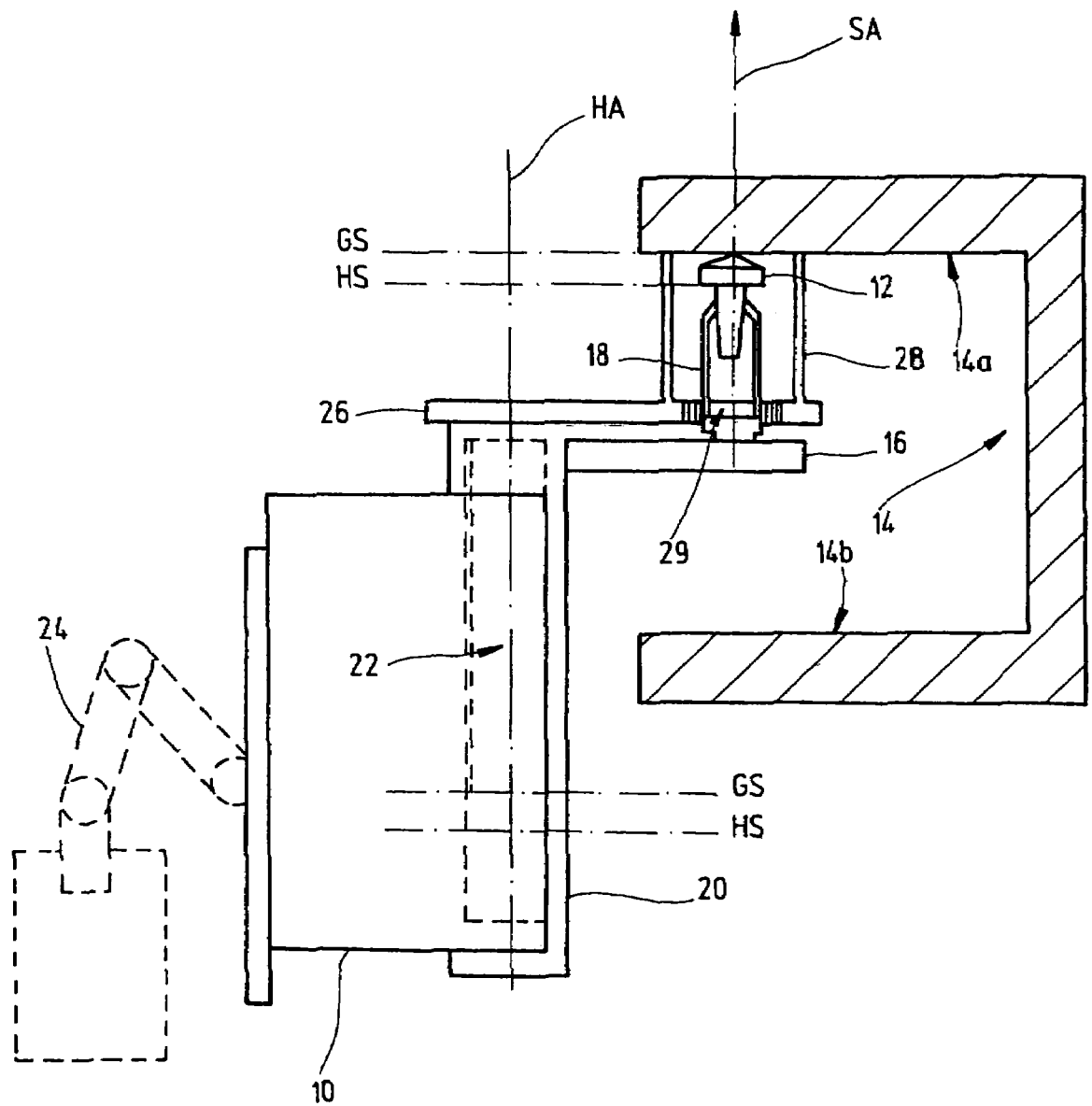
FIG. 1 shows a schematic view of a welding head according to the prior art, having a boom welding forward.

FIG. 1 shows a welding head 10 known in the prior art, welding 'forward' and suitable for use in applications where there is not enough room to position the complete welding head 10 directly above a weld location. For example, it may be required to weld a bolt 12 into an opening of a part 14, say a tube, into which the welding head 10 will not fit. For automated welding of the bolt 12 with the welding head 10 despite the lack of space, the top of the welding head 10 is fitted with a boom 16 connected to a bolt holder 18. By means of the boom 16, it is possible for a welding axis SA to be offset parallel to a lift axis HA. As a result, the welding head 10 need not be introduced into the aperture of the tube 14 in order to weld the bolt forward along the welding axis SA, as indicated by the arrowhead at the welding axis SA, but it may be positioned outside of the tube 14.

Further, the welding head 10 comprises a lift device 20 by means of which a welding unit 22 is transportable along the lift axis HA. In FIG. 1, the welding unit 22 comprises the boom 16, the bolt holder 18 and an element transportably lodged in the lift device 20. In FIG. 1, a dashed line partly represents the interior of the lift device 20. The lift device 20 can transport the welding unit 22 in its interior, for example with a linear motor (not shown), along the lift axis HA.

FIG. 1 shows the situation in which the welding unit 22 is run all the way 'forward.' 'Forward' means upward in the plane of the drawing of FIG. 1. In the interior of the lift device 20, there is enough room rearward to transport the welding unit 22 out of a base position GS into a lift position HS. The base position GS and the lift position HS are indicated in FIG. 1 by horizontal dotted lines.

In the following, with reference to FIG. 1, the course of a welding operation will be roughly outlined. The welding head 10, for example by means of a robot 24 of the kind originally mentioned, may first be run into a position whence the welding head, with the aid of a carriage 26 capable of electric or pneumatic operation, can be run into the base position GS (cf. also positioning of the welding head 10 with respect to the carriage 26 in FIGS. 2 and 3). Also, a nozzle 28 may be attached to the welding head 10. The nozzle 28 in FIG. 1 is fixedly connected to the welding head 10 and comprises an opening 29 through which the bolt holder 18 reaches. Before the nozzle 28 is seated on the inside of the top segment 14a of the tube 14, it is possible that the bolt 12 may protrude from another opening of the nozzle 28 (cf. also FIG. 2). The welding unit 22, and with it the bolt 12, held by the bolt holder 18, moves at the instant when the nozzle 28 is seated on the part 14, downward or rearward by a suitable amount, whereby both the nozzle 28 and the welding unit 22 are located in base position.

A nozzle 28 is commonly used when working with protective gas in order to obtain better welding results. For that purpose, the nozzle 28 also defines a welding gas shield by forming a space around the weld location to collect the protective gas, located substantially concentrically with a portion of the fastener holder 18. The nozzle 28 may at the same time serve as a support foot. With the aid of a support foot, a welding head is run into its base position.

After the welding unit 22 has been brought into the base position GS, the lift device 20 transports it into the lift position HS. When the bolt 12 and the tube 14 have been incipiently fused sufficiently, the bolt 12 is transported in the welding direction, i.e., from the lift position HS towards the base position GS. However, the size configuration pictured here is not to scale. As a rule, the welding head 10 is much larger than the bolt 12 and the bolt holder 18. With a device according to FIG. 1, therefore, automated welding in 'forward direction' at places of difficult access is possible, the welding axis SA lying offset parallel to the lift axis HA. However, this mode of welding is not possible when the segment 14b of part 14 shown in FIG. 1 at bottom extends so far to the left in FIG. 1 that working from 'below' with a welding head 10 is no longer possible.

Referring to FIGS. 2 to 5, the operation of joining two parts one to the other will be explained. In FIG. 2, a schematic joining device is generally designated 30. The joining device 30 comprises a joining unit 22, a joining head 10 and a lift device 20. The joining device 30 is to be described in terms of an arc welding device. However, this does not represent any limitation to arc welding. Still other possible applications will be discussed towards the end of the description.

The part in FIG. 2 may for example be a trunk cover 32 of a motor vehicle, to which bolts are to be attached. Into the plane of the drawing of FIG. 2, the lengthwise direction of the trunk cover 32 extends. In FIG. 3, a schematic sectional side view may be noted.

The bolt 12 is to be attached at the center of the lengthwise direction of the trunk cover 32. This cannot be done with a welding head according to FIG. 1, because this is usable only for weld locations at the outside lateral edge of the cover 32. Access from the side at the top in FIG. 2 is not possible with a welding head according to FIG. 1, because this would have to pierce the trunk cover 32 in order to be able to weld 'forward.' Access from below does not make sense, since the bolt is not to be welded to the opposed side in the cover 32.

The welding head 10 of FIG. 2 according to the invention comprises a lift means 20 transportable along a lift axis HA. To the lift means 20 a boom 16 is attached, to which a bolt holder 18 couples mechanically. A nozzle 28 is provided additionally. The welding head 10 may be mounted on a robot arm (not shown; cf. FIG. 1). In order to be run into the welding position, the robot arm can transport the welding head 10 dynamically into a position in the neighborhood of the weld position. This situation is illustrated in FIG. 2. The welding head 10 is maximally extended relative to a carriage 26 to which it is connected, i.e. it is run maximally upward in FIG. 2. The bolt 12 projects beyond the wider aperture of the nozzle 28 and does not touch the trunk cover 32.

In FIG. 3, the welding head 10 has been run downward by means of the carriage 26, so that the bolt 18 is seated in the desired weld position on the inside of the trunk cover 32. By way of the bolt 18, the welding unit 22 is run a small distance relative to the welding head 10. We see that compared to FIG. 2, a longer portion of the welding unit 22 protrudes from the welding head 10 in the direction of the lift axis HA. The bolt 12 and hence also the welding unit 22 are in a base position in FIG. 3.

To bring the bolt 12 into a lift position, the welding unit 22 is run out relative to the welding head 10 by means of the lift device 20. The welding unit 22 may but need not necessarily be fully extended. For that purpose, the lift device 20 may, for example, comprise an automatic actuator such as a linear motor 33 moving the welding unit 22 against the force of a spring 35. The lift position is illustrated in FIG. 4. The welding unit 22 has been run still farther out of the welding head 10 than in FIG. 3. The bolt 12 no longer touches the trunk cover 32. However, the nozzle 28 is seated on the cover 32. The welding current may now be switched on for welding.

FIG. 5 shows the situation in which the bolt 12 has again been moved towards the trunk cover 32 by means of the welding unit 22. Compared to FIG. 4, it is clearly seen that the portion of the welding unit 22 protruding from the welding head 10 is definitely shorter. Furthermore, in FIG. 5, the nozzle 28 of FIGS. 2 to 4 has been exchanged for a support foot 34. However, this does not affect the course of the welding operation. The support foot 34, like the nozzle 28, merely fixes the position of the welding head 10 relative to the cover 32.

Figure 6:
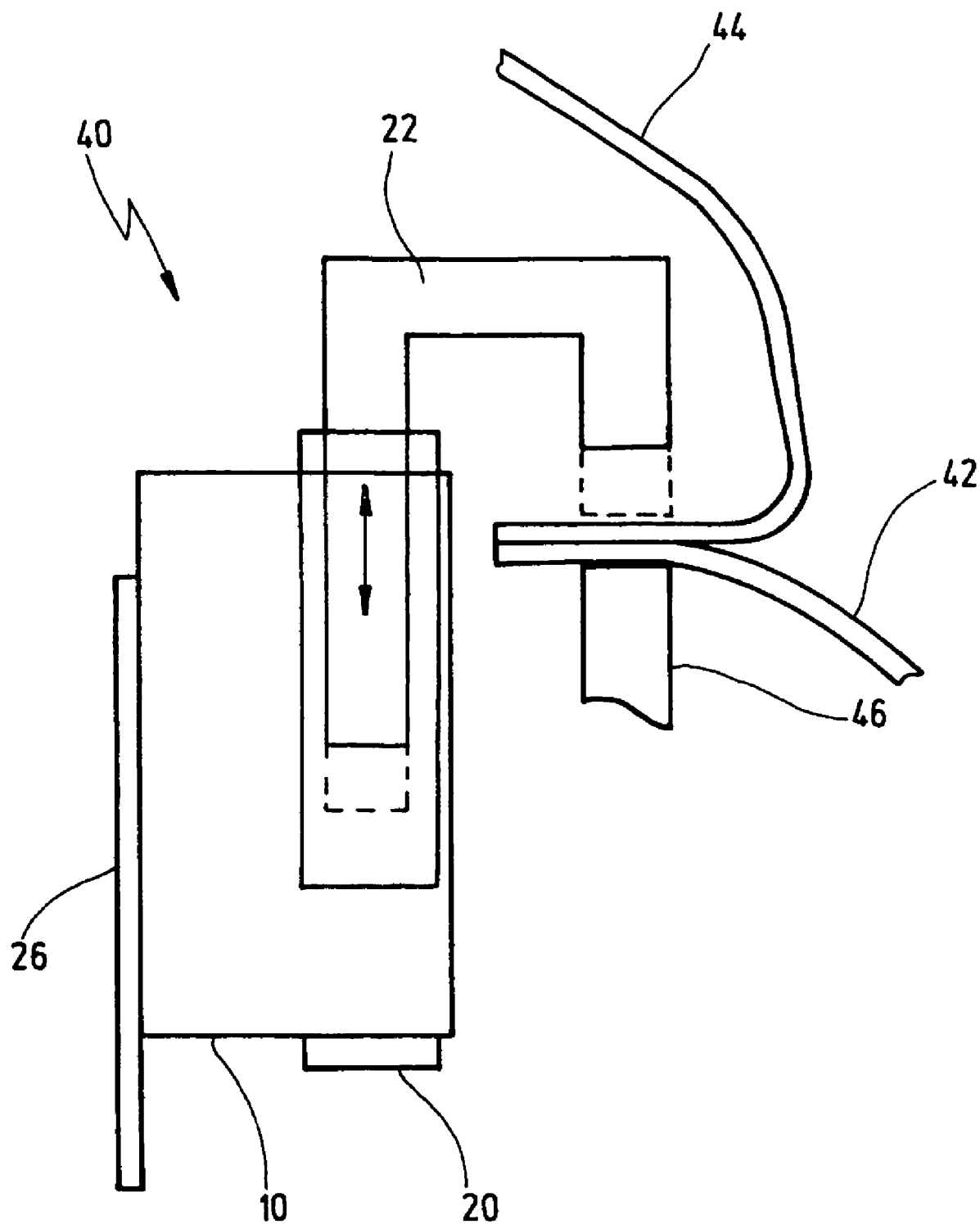
FIG. 6 shows another embodiment of the joining device according to the invention.

It is clear that the invention is not employable for arc welding only. FIG. 6 schematically shows a spot welding device 40. With the spot welding device 40, two parts 42 and 44 can be welded together. The device 40 comprises a welding head 10, a lift device 20 and a welding unit 22 transportable into a lift position out of the welding head 10. Further, a counterelectrode 46 is provided, arranged opposed to the welding unit 22 in the neighborhood of a weld location. The transportability is represented by the dotted lines on the welding unit 22.

There are the further possibilities of welding with or without support foot, with or without nozzle, and with or without protective gas. Reversing the direction of welding leaves all functions and advantages of the welding head unchanged. However, the invention may also be employed in the fields of riveting, e.g. blind riveting, or punching.

What is claimed is:

1. A joining device for the joining of two parts, one to the other, the joining device comprising:
    a joining head comprising a lift device operating to linearly transport a joining unit within an interior of the lift device along a lift axis relative to the joining head, said joining device executing a joining operation by transporting the joining unit by operation of the lift device out of a lift position towards a base position;
    said joining unit comprising a boom extending outside of the joining head, the boom having a free end at which the joining operation takes place offset parallel to the lift axis;
    wherein the joining unit is so oriented relative to the joining head so that the joining unit is extended relative to the joining head in the lift position.

2. The joining device according to claim 1, wherein the joining unit is further so oriented relative to the joining head that the joining unit is retracted into the joining head in the base position.

3. The joining device according to claim 1, wherein the joining unit comprises a holding device for holding one of the parts.

4. The joining device according to claim 3, wherein the held part is a bolt and the holding device is a bolt holder.

5. The joining device according to claim 1, wherein the joining head is a welding head.

6. The joining device according to claim 1, further comprising a support foot projecting in the direction of joining.

7. The joining device according to claim 1, further comprising a carriage, the joining head being mounted on the carriage.

8. The joining device according to claim 1, wherein the lift device comprises a linear motor pre-stressable by a spring.

9. The joining device according to claim 1, wherein the lift device comprises a linear motor that is run out in the lift position.

10. A joining device comprising:
    a head;
    a guide coupled to and automatically moving the head;
    an automatic actuator coupled to the head;
    a boom coupled to the actuator, and being movable toward and away from the head due to operation of the actuator;
    a fastener holder coupled to and movable with the boom; and
    the fastener holder being automatically movable to join in a rearward direction.

11. The joining device according to claim 10, further comprising:
    an elongated support stationarily coupled to at least one of: (a) the head, and (b) the actuator; and
    a member projecting substantially perpendicular from the support, at least a majority of the member being substantially parallel to the rearward direction;
    the member having a workpiece-contacting end.

12. The joining device according to claim 11, wherein the member is a welding gas shield located substantially concentrically with a portion of the fastener holder.

13. The joining device according to claim 11, wherein the member is an elongated foot with the end being offset from a segment of the member adjacent the support.

14. The joining device according to claim 10, further comprising a weld-bolt held by the fastener holder.

15. The joining device according to claim 10, further comprising a rivet held by the fastener holder.

16. The joining device according to claim 10, wherein the actuator is a linear motor.

17. The joining device according to claim 10, wherein the actuator, boom and fastener holder define a substantially inverted U-shape.

18. A joining device comprising:
    a welding head, the welding head having a support foot transversely extending therefrom allowing a contact position between the support foot and a welding workpiece;
    a linear carriage operably moving the head along a first axis;
    an actuator coupled to the head and being elongated along a second axis substantially parallel to and offset from the first axis;
    a boom coupled to and movable with the actuator, the boom being elongated along a third axis substantially perpendicular to the second axis;

a fastener holder connected to the boom operating to temporarily retain a fastener during a welding operation, the fastener being spaced prior to welding from the welding workpiece by contact of the support foot and the welding workpiece; and the boom allowing workpiece welding in a rearward direction substantially parallel to the first and second axes.

* * * * *